United States Patent
Jennings et al.

(10) Patent No.: US 11,935,086 B2
(45) Date of Patent: *Mar. 19, 2024

(54) SYSTEMS AND METHODS FOR OPTIMIZING ALLOCATION OF POINTS

(71) Applicant: Synchrony Bank, Stamford, CT (US)

(72) Inventors: Leonard Jennings, Stamford, CT (US); Claire Quinn, Stamford, CT (US); M. Ramona Bryson, Stamford, CT (US); Deirdre Baker, Stamford, CT (US); Marcia Englefield, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,300

(22) Filed: Feb. 10, 2023

(65) Prior Publication Data

US 2023/0274306 A1    Aug. 31, 2023

Related U.S. Application Data

(63) Continuation of application No. 17/335,967, filed on Jun. 1, 2021, now Pat. No. 11,610,219.

(Continued)

(51) Int. Cl.
*G06Q 30/00* (2023.01)
*G06Q 30/0207* (2023.01)
(Continued)

(52) U.S. Cl.
CPC ..... *G06Q 30/0226* (2013.01); *G06Q 30/0215* (2013.01); *G06Q 30/0238* (2013.01)

(58) Field of Classification Search
None
See application file for complete search history.

(56) References Cited

U.S. PATENT DOCUMENTS

| 7,398,248 B2 | 7/2008 | Phillips et al. |
| 8,408,455 B1 | 4/2013 | Taylor et al. |

(Continued)

FOREIGN PATENT DOCUMENTS

| CN | 106888156 A | | 6/2017 | |
| JP | 2006163755 A | * | 6/2006 | |
| WO | WO-2008021382 A2 | * | 2/2008 | ............. G06Q 30/02 |

OTHER PUBLICATIONS

Office Action dated Sep. 1, 2021 in U.S. Appl. No. 17/335,967.

(Continued)

*Primary Examiner* — Michael Bekerman
(74) *Attorney, Agent, or Firm* — Polsinelli LLP

(57) ABSTRACT

In one aspect of the present disclosure, a device includes one or more memories having computer-readable instructions stored therein and one or more processors. The one or more processors are configured to execute the computer-readable instructions to receive, over a period of time, information regarding transactions conducted in association with a user account; identify a category associated with one or more of the transactions based on the information, wherein identifying yields a number of categories; generate a ranking of the categories based on a transaction parameter; assign a different number of points to corresponding transactions in one or more of the categories based on the ranking, with a highest number of points assigned to the corresponding transactions in at least one category with highest ranking; and apply the corresponding number of points to the user account.

24 Claims, 7 Drawing Sheets

Related U.S. Application Data

(60) Provisional application No. 63/055,773, filed on Jul. 23, 2020, provisional application No. 63/033,019, filed on Jun. 1, 2020.

(51) Int. Cl.
  *G06Q 30/0226* (2023.01)
  *G06Q 30/0238* (2023.01)

(56) References Cited

U.S. PATENT DOCUMENTS

| | | |
|---|---|---|
| 8,452,654 B1 | 5/2013 | Wooters et al. |
| 10,915,915 B1 | 2/2021 | Lieberman et al. |
| 2002/0198803 A1 | 12/2002 | Rowe |
| 2003/0200144 A1 | 10/2003 | Antonucci et al. |
| 2004/0088221 A1 | 5/2004 | Katz et al. |
| 2004/0122736 A1 | 6/2004 | Strock et al. |
| 2007/0156530 A1* | 7/2007 | Schmitt ............... G06Q 30/02 705/14.27 |
| 2007/0250382 A1 | 10/2007 | Beck |
| 2007/0288372 A1 | 12/2007 | Behar et al. |
| 2009/0313110 A1 | 12/2009 | Asai et al. |
| 2012/0066045 A1* | 3/2012 | Schmitt ............... G06Q 40/02 705/14.25 |
| 2015/0058105 A1* | 2/2015 | Fonseca ............ G06Q 30/0226 705/14.17 |

OTHER PUBLICATIONS

Office Action dated Jun. 8, 2022 in U.S. Appl. No. 17/335,967.
Notice of Allowance dated Nov. 16, 2022 in U.S. Appl. No. 17/335,967.
Notice of Allowance dated Dec. 8, 2022 in U.S. Appl. No. 17/335,967.
Shan, Yiming, "A Mobile Application for Maximizing Credit Card Rewards," Year: 2017.

* cited by examiner

| | January | February |
|---|---|---|
| Actual spend | $1000 – Travel<br>$700 – Dining<br>$650 – Groceries<br>$1000 – all other purchases (across several MCC categories) | $500 – Groceries<br>$300 – Gas<br>$200 – Travel<br>$900 – all other purchases (across several MCC categories) |
| 3Xs Category | Travel | Groceries |
| 2Xs Category | Dining | Gas |
| 1Xs Category | Groceries + all other | Travel + all other |

FIG. 6

SYSTEMS AND METHODS FOR OPTIMIZING ALLOCATION OF POINTS

CROSS REFERENCE TO RELATED APPLICATIONS

The present application is a continuation of U.S. patent application Ser. No. 17/335,967 filed Jun. 1, 2021, which claims priority to U.S. Provisional Patent Application 63/033,019 filed on Jun. 1, 2020, and U.S. Provisional Application 63/055,773 filed on Jul. 23, 2020, the entire content of each of which is incorporated herein by reference.

BACKGROUND

Field of the Disclosure

The present disclosure relates to a secure system for automated and dynamic adjustment in allocation of points to a user account. More specifically, the disclosure is related to monitoring changes in activity within a user account and adjusting the allocation of points based on the monitored changes.

Description of the Related Art

Today, a loyalty program card value proposition allows cardholders to earn rewards on fixed purchase categories, which are the same for all cardholders of that card type. Rewards categories do not adjust based on changes in spending patterns and preferences for any given account. Accordingly, backend systems for processing credit card rewards are programmed statically to simply detect any purchase related to an applicable category for rewards and assign prefixed points to such purchases. This in turn forces the use of multiple credit cards by consumers to achieve maximum and optimal rewards, each of which may have a statically programmed backend system to provide rewards on spending in a particular category such as travel, dining, gas, grocery, etc. that will give them the highest rewards based on the purchase type. Accordingly, a single card issuer may have to offer multiple reward cards (each rewarding a particular category of purchases) and hence run multiple statically programmed backend systems in order to attract as many subscribers as possible.

SUMMARY

To address the deficiencies in the existing legacy systems used for user reward programs, the present disclosure provides a processing system that is configured to monitor changes in a user's spending trends who is using a single financial vehicle such as a credit card. The changes in spending trends are captured via a periodic ranking of categories of transactions conducted using the financial vehicle. Different number of points are assigned to each category based on the ranking. Accordingly, a single backend system is configured to capture the periodic changes in spending trends and optimize the assignment of the points. This optimization enables financial institutions and card issuers to eliminate the need for issuance of multiple separate cards and loyalty programs to consumers, each of which may require separate and additional processing capacities and statically configured resources (to capture one particular type of purchase for reward calculation) on the backend, resulting in inefficient use of system resources.

In one aspect of the present disclosure, a device includes one or more memories having computer-readable instructions stored therein and one or more processors. The one or more processors are configured to execute the computer-readable instructions to receive, over a period of time, information regarding transactions conducted in association with a user account; identify a category associated with one or more of the transactions based on the information, wherein identifying yields a number of categories; generate a ranking of the categories based on a transaction parameter; assign a different number of points to corresponding transactions in one or more of the categories based on the ranking, with a highest number of points assigned to the corresponding transactions in at least one category with highest ranking; and apply the corresponding number of points to the user account.

In another aspect of the present disclosure, the transaction parameter is a total amount spent in each category.

In another aspect of the present disclosure, the transaction parameter is a number of transactions in each category.

In another aspect of the present disclosure, the ranking changes from one period of time to a next period of time.

In another aspect of the present disclosure, the one or more categories having the highest ranking in a first period of time is different from at least one other category having the highest ranking in a second period of time.

In another aspect of the present disclosure, the categories are defined by one or more of merchant category codes, each of which identifies a different product category; merchandise identifiers, each of which identifies a particular type of product; merchant identifiers, each of which identifies a different merchant; transactional behavioral identifiers, each of which corresponds to a different consumer transactional behavior; and one or more bonusing identifiers, each of which specifies a structure for assigning bonus points to the corresponding transactions in the account.

In another aspect of the present disclosure, the device is configured to communicate with one or more point of sale devices or a payment processing server to receive the information associated with the one or more transactions.

In another aspect of the present disclosure, the one or more processors are configured to execute the computer-readable instructions to generate a list of the categories; and associate, in real-time and as corresponding information is received, each transaction with one of the categories.

In another aspect of the present disclosure, the different number of points is based on a point allocation scheme.

In another aspect of the present disclosure, the point allocation scheme is applied retroactively to corresponding transactions in a period for which the categories are ranked.

In one aspect of the present disclosure, one or more non-transitory computer-readable media comprising computer-readable instructions, which when executed by one or more processors of at least one server, cause the at least one server to receive, over a period of time, information regarding transactions conducted in association with a user account; identify a category associated with one or more of the transactions based on the information, wherein identifying yields a number of categories; generate a ranking of the categories based on a transaction parameter; assign a different number of points to corresponding transactions in one or more of the categories based on the ranking, with a highest number of points assigned to the corresponding transactions in at least one category with highest ranking; and apply the corresponding number of points to the user account.

In one aspect of the present disclosure, a device includes one or more memories having computer-readable instructions stored therein and one or more processors. The one or more processors are configured to execute the computer-readable instructions to receive information associated with one or more transactions; associate each of the one or more transactions with at least one category of transactions based on the information; periodically generate a ranking of categories with which the one or more transactions are associated; periodically assign a different number of points to corresponding transactions in each of the categories based on the ranking; determine, based on the different number of points, a total number of points assigned to each of the one or more transactions; and apply the total number of points to a user account associated with the one or more transactions.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 is an example of dynamic point allocation for two different periods when a point allocation methods of the present disclosure are applied to an account, according to an aspect of the present disclosure.

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, to address the deficiencies in the existing legacy systems used for user reward programs, the present disclosure provides a processing system that is configured to monitor changes in a user's spending trends that is using a single financial vehicle such as a credit card. The changes in spending trends are captured via a periodic ranking of categories of transactions conducted using the financial vehicle. Different number of points are assigned to each category based on the ranking. Accordingly, a single back-end system is configured to capture the periodic changes in spending trends and optimize the assignment of the points. This optimization enables financial institutions and card issuers to eliminate the need for issuance of multiple separate cards and loyalty programs to consumers, each of which may require separate and additional processing capacities and statically configured resources (to capture one particular type of purchase for reward calculation) on the backend, resulting in inefficient use of system resources.

The disclosure begins with a description of an example system in which the concepts presented herein may be implemented.

Figure 1:
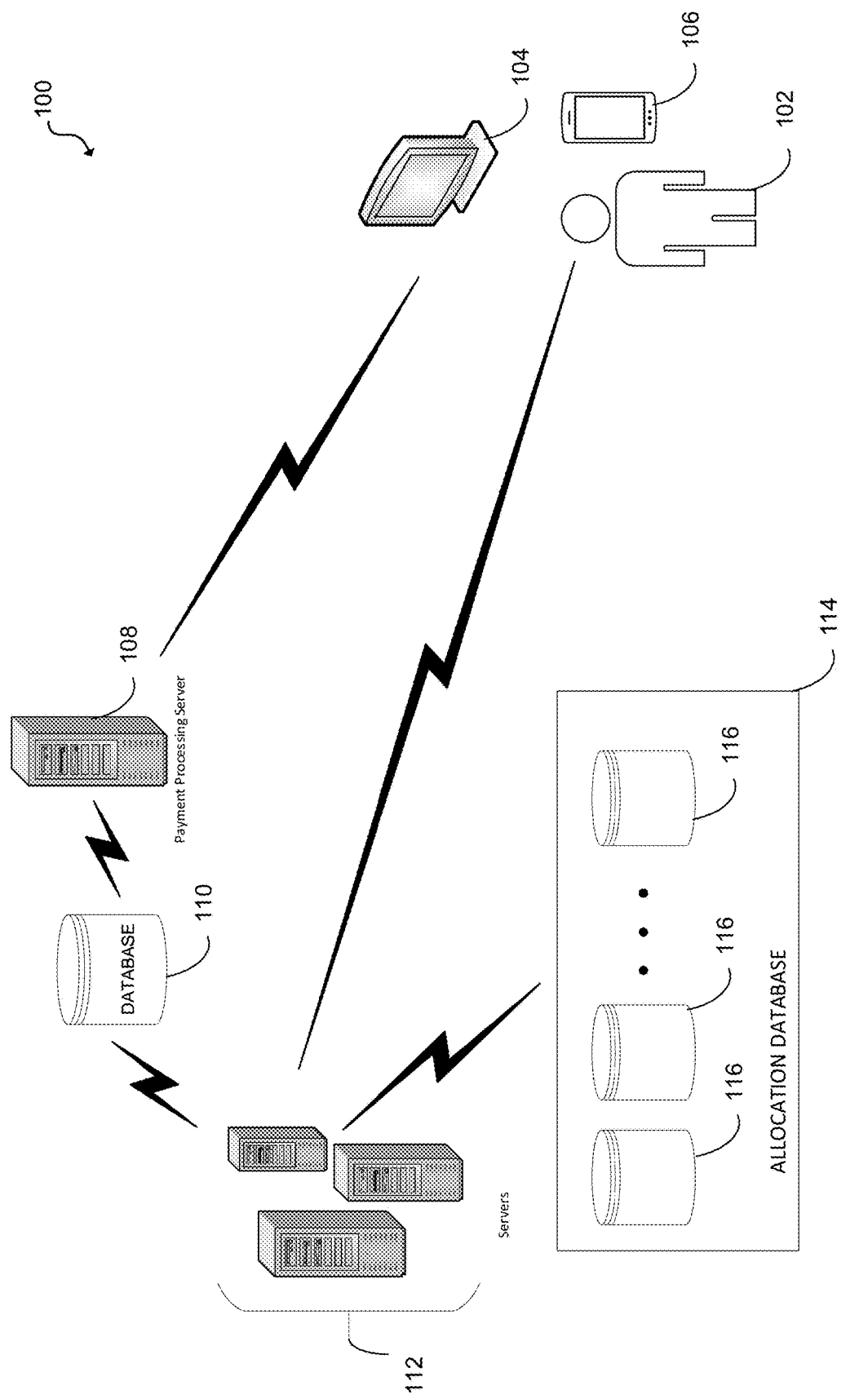
FIG. 1 is an example system for monitoring and processing transactions and corresponding rewards, according to an aspect of the present disclosure.

FIG. 1 is an example system for monitoring and processing transactions and corresponding rewards, according to an aspect of the present disclosure.

In setting 100, it is assumed that user 102 is at a Point of Sale (POS) device 104 conducting a transaction using a financial vehicle. The financial vehicle can be, but is not limited to, a credit card, a cardless method of payment using device 106, etc. Device 106 can be any known or to be developed mobile device, a laptop, a tablet, a smart device such as a smart watch, etc.

A transaction may be conducted with respect to a service or a product offered for sale by a merchant associated with POS device 104. Alternatively, a transaction may be an online commerce transaction where user 102, using device 106, conducts a transaction for a product or service offered by a merchant for sale online. In this context, POS device 104 may be a web payment portal or a website of a merchant. As part of the transaction, financial information of the financial vehicle (e.g., credit card number, associated security code, associated security code and/or zip code) may be provided to the merchant and used to charge the financial account of user 102 for the cost of products/services obtained.

A payment processing server 108 of a financial institution associated with the financial vehicle used for purchasing the product/service may then process the payment according to any known or to be developed method. In doing so, payment processing server 108 may communicate with one or more external payment processing servers and institutions of the merchant associated with POS device 104.

While FIG. 1 illustrates a single instance of a transaction, in reality many more transactions with users such as user 102 and merchants such as the merchant described with reference to POS device 104 may be conducted, which could be conducted simultaneously or not. Accordingly, there may be multiple payment processing servers such as payment processing server 108 utilized to handle processing all transactions.

Information about each transaction processed may then be stored in a database such as database 110. Such information may be a data string that include information such as date, time, amount, product/service descriptions, merchant information, Merchant Category Code (MCC), etc.

Examples of MCC codes include, but are not limited to, groceries, travel, entertainment, dining, gas, etc. Examples of merchant types can include any particular merchant such as a grocery store chain (e.g., SAFEWAY, WHOLE FOODS, etc.), a department store (e.g., MACY'S, JC PENNY, etc.), a brand store (e.g., BANANA REPUBLIC, TIFFANY, etc.). Examples of product types or services include, but are not limited to, clothing, airlines, hotels, fitness, etc. More refined product types may include examples such as denims, jackets, shirts, jeans, lighting, furniture, books, electronics, etc.

Setting 100 also includes multiple servers 112, which may be referred to as rewards servers 112. Rewards servers 112 may be co-located in the same physical location or may be distributed remotely and communicatively coupled via a cloud based structure. As will be described below, rewards servers 112 may access database 110 to retrieve stored data strings associated with each recorded/processed transaction for purposes of automated reward optimization for each consumer such as user 102.

Setting 100 further illustrates details of an allocation database 114. Allocation database 114 may be utilized by merchant servers to store results of processing transactions for reward determination. As will be further described below, rewards servers 112 may analyze each transaction to identify MCC codes, merchant type, product type, transaction amount, etc., which may be referred to as transactions metadata used for defining categories for the transactions. In another example, rewards servers 112 may receive additional information (metadata) from merchants with which a user conducts transactions indicative of a user's behavioral transaction traits that may be used for separating transactions and assigning them to different buckets, as will be described below.

Categories may be defined based on one or more of the following. Furthermore, each category may have one or more point allocation schemes (e.g., 5-4-3-2-1, 3-2-1, etc.) associated therewith, which will be further described below.

One example category is merchant category codes (MCC), each of which identifies a different product category (e.g., grocery, travel, dining, gas, etc.). Another example category is merchandise identifiers, each of which identifies a particular type of product (clothing, lighting, furniture, fitness equipment, etc.). In one example, product types may be defined with more granularity. For example, instead of assigning a different bucket to clothing, lighting, furniture, etc., a different category may be assigned to different types of clothing such as denims, jackets, jeans, etc., or different types of furniture such as beds, dining room furniture, etc.

Another example category is merchant identifiers, each of which identifies a different merchant (e.g., BANANA REPUBLIC v. WHOLE FOODS v. WALMART, etc., as described above).

Another example category is transactional behavioral identifiers, each of which corresponds to a different consumer transactional behavior, the metadata of which may be provided by merchants. Examples of transactional behavioral identifiers include referrals, in-store visits, online clicks, posts on social networks, etc., which will be further described below.

Another example category is one or more bonusing identifiers, each of which specifies a structure for assigning bonus points to the corresponding transactions in the account. For example, one bonusing structure, as will be described below, may be used in conjunction with one or more categories described above. In such example, a bonusing identifier may be used in conjunction with MCC codes such that when spending in a particular category exceeds a defined threshold, an additional multiplier may be applied to points assigned to transactions in the particular category. In another example, a multiplier may be applied to the underlying allocation scheme for assigning point (e.g., 5-4-3-2-1, 3-2-1, etc.) for a given period. The multiplier and the given period may be determined based on experiments and/or empirical studies.

Another example bonusing structure that may be used to define categories is looking at transactions across all categories (regardless of categories) and assigning different points to ranked transactions. For example, a single highest transaction may be assigned 3 points per dollar spent, second single highest transaction may be assigned 2 points per dollar spent, etc.

Transactions belonging to each category may then be stored in a corresponding bucket. Allocation database 114 may include several buckets 116 each corresponding to a different category. Over a predetermined period and for each user, transactions are categorized and stored in buckets 116, with rewards servers 112 then ranking buckets 116 at the end of each period for determining optimized allocation of points/rewards to the corresponding user.

In an alternative, setting 100 may be such that databases 110 and 114 are the same and/or that payment processing servers 108 and rewards servers 112 are the same as well.

In one example, financial institution associated with setting 100 may directly issue financial vehicles (e.g., credit cards) to consumers, in which case such financial institution defines categories (and corresponding point allocation schemes) for consumers to select from, based on which transactions are then separated into buckets for ranking and point assignment. In another example, such financial institution may issue a financial vehicle such as a credit card in partnership with a business partner (e.g., a particular retailer, a particular service provider, a particular product manufacturer, etc.). In such case, the business partner may specify one or more categories and one or more associated point allocation scheme, which are then made available to consumers. A consumer may then select one of the available categories and/or point allocation schemes to be applied to the account.

Various components of setting 100 may communicate with one another using any known or to be developed wired and/or wireless communication schemes, media and protocol. For example, as shown in FIG. 1, such communications may be wireless over a cellular connection, a Wi-Fi connection, etc.

With an example setting 100 described with reference to FIG. 1, the disclosure now describes an example method for optimizing allocation of points.

Figure 2:
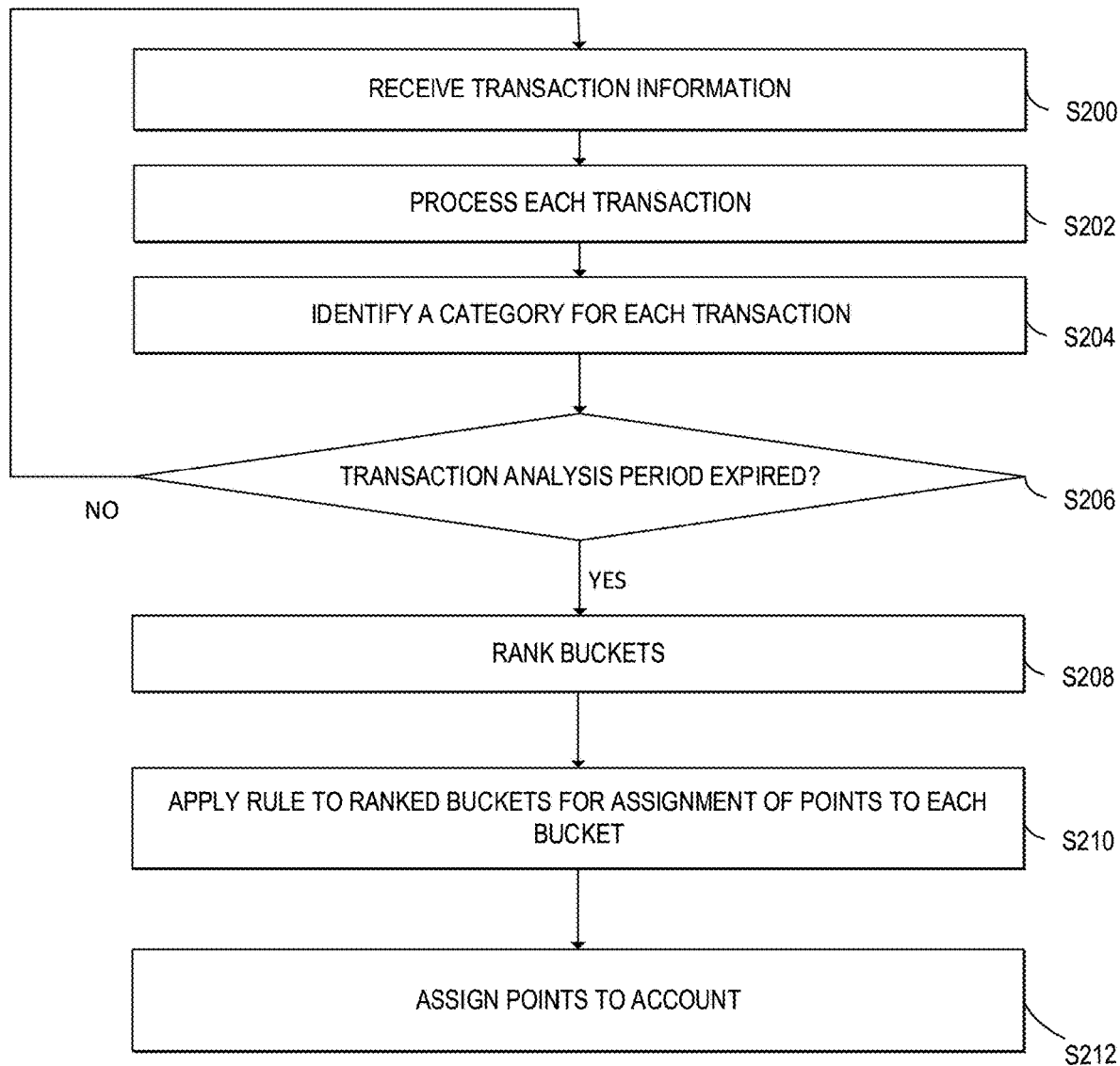
FIG. 2 is an example method of optimizing point allocations, according to an aspect of the present disclosure.

FIG. 2 is an example method of optimizing point allocations, according to an aspect of the present disclosure.

FIG. 2 will be described from the perspective of one or more of rewards servers 112. However, it should be understood that servers 112 may have one or more memories having stored thereon computer-readable instructions, which when executed by one or more associated processors, cause servers 112 to perform functionalities described below with reference to FIG. 2.

At S200, rewards servers 112 may receive transaction information. Such transaction information may be retrieved periodically from database 110 or may be directly received from payment processing server 108 upon processing of each transaction. Said periodicity may be set such that rewards servers 112 may query database 110 every set period of time (e.g., every minute, every hour, every day, etc.) to determine if new strings indicative of recently processed transactions are stored in database 110 or not. Said periodicity may be a configurable parameter determined based on experiments and/or empirical studies. Alternatively, there may be no periodic check by rewards servers 112 but instead, as soon as a new string is stored in database 110 and/or as soon as a transaction is processed by payment processing server 108, corresponding string may be fetched to rewards servers 112 for reward processing, in real-time. Accordingly, transaction information may be received by rewards servers 112 in real-time.

At S202, rewards servers 112 process each transaction (e.g., relevant string of information queried/fetched from database 110 and/or payment processing server 108) to identify customer information, relevant category for the transaction (with a category corresponding to one of the categories described above), amount of the transaction, date of the transaction, etc. As noted above, such category may be based on MCC codes of transactions, merchant type, product/service type, etc.

At S204, rewards servers 112 store each transaction in one of buckets 116 depending on the identified category at S202. In other words, rewards sever 112 identifies a category for each transactions, with each bucket corresponding to one of the categories.

At S206, rewards servers 112 determine if a period for analyzing transactions for reward/point allocation has expired. As will be described below, such periodicity may be a configurable parameter set by a consumer/user using an application/User Interface (UI).

If not expired, the process reverts back to S200 and rewards servers 112 repeat S200 to S206 until the period expires. Once the period expires, allocation database 114 may have multiple buckets 116, in each of which multiple transactions and relevant information for rewards determination are stored.

At S208, rewards servers 112 rank buckets 116 (ranks categories) according to a transaction parameter. Such transaction parameter can be a number of transactions in each bucket 116, a total amount spent in each category, etc. In another example, a combination of several transaction parameters may be used for ranking buckets. For example, when two buckets have the same number of transactions in them, then rewards servers 112 may rank the bucket with highest total amount spent higher than the other bucket having the same number of transaction but a lesser total amount spent.

Once ranked, at S210, rewards servers 112 apply a rule (point allocation scheme) to the ranked buckets/categories for assigning points to transactions in each category/bucket. Such rule may be a configurable parameter determined/specified via same UE as that via which periodicity used at S206 is specified. Such UI will be further described below.

A non-limiting rule may be a range of discrete numbers (e.g., 5, 4, 3, 2, 1) each of which may be assigned to transactions spent in each category in a descending order. For example, 5 points may be assigned to every dollar amount spent in the highest ranked bucket, 4 points may be assigned to every dollar amount spent in the second highest ranked bucket, 3 points may be assigned to every dollar amount spent in the third highest ranked bucket, 2 points may be assigned to every dollar amount spent in the fourth highest ranked bucket, while 1 point is assigned to every dollar spent in the lowest ranked bucket.

In one example, a ranking of buckets may be such that two or more buckets may be ranked the same (e.g., having the same number of transactions and/or the same total amount spent). Accordingly, same number of points may be assigned to each transaction in both buckets.

Another example rule may be a percentage based rule (e.g., 3%, 2%, 1%). Accordingly, 3% cash back may be credited to a given user's account as a percentage of the total amount spent in the highest ranked category, 2% cash back may be credited to a given user's account as a percentage of the total amount spent in the second highest ranked category, 1% cash back may be credited to a given user's account as a percentage of the total amount spent in the lowest ranked category, etc.

Another example rule may be a variable or progressive point system with a defined point scheme (e.g., 3-2-1) with a multiplier if certain conditions are met. For example, if spending in a given category exceeds a threshold, a number of points assigned to every dollar amount spent in that category maybe multiplied by a factor (e.g., 2, 3, etc.) such that the defined point scheme may be changed to, for example, 6, 2, 1 (assuming only spending in the highest ranked category exceeds the threshold. If all categories exceed a set threshold, then each category may receive a multiplier (e.g., 3-2-1 point scheme may be multiplied by, for example, 2 to result in 6-4-2 point scheme). In another example, a multiplier may be applied to the underlying point scheme for assigning point (e.g., 5-4-3-2-1, 3-2-1, etc.) for a given period (e.g., 3-2-1 point scheme may be multiplied by, for example, 2 to result in 6-4-2 point scheme). The multiplier and the given period may be determined based on experiments and/or empirical studies.

In one example, a ranking of buckets may be such that two or more buckets may be ranked the same (e.g., having the same number of transactions and/or the same total amount spent). Accordingly, same percentage cash back points may be assigned to each of the two buckets as a percentage of the total amount spent in each bucket.

At S212, rewards servers 112 determine a total number of points to be assigned to a corresponding account of a user based on the different number of points assigned to each bucket at S210. For example, the assignment of points to each category may result in 5000 points to transactions in the highest ranked category, 3000 points to transactions in the next highest ranked category and 1000 points to transactions in the lowest ranked category. Accordingly, a total of 9000 points is assigned to all transactions in a user's account for a given period, which is then applied to the user's account at S212.

Upon performing S212, the process reverts back to S200 and rewards servers 112 repeat the process of FIG. 2, periodically. Accordingly, rewards servers 112 periodically categorize transactions, rank the categories and assign points to the ranked categories to optimize allocation of points. When a user's spending pattern changes from one period to the next (e.g., from spending the most on travel category in a first period to spending the most on grocery in the second period), the process of FIG. 2 results in a different ranking of categories and hence different assignment of points to transactions in each category. Therefore, backend processing center of setting 100 can use rewards servers 112 to dynamically optimize this process while allowing the use of a single financial vehicle by a user to capture the most points for a user depending on their spending patterns. As a consequence, backend processing system of setting 100 need not have multiple reward processing servers and capacities each dedicated to a separate/fixed rewards program/card, each of which (or multiple ones) being used by a single user.

As noted above with reference to the process of FIG. 2, one or more variables for optimizing allocation of points may be set by a user using a UI. Such parameters include periodicity (point allocation periodicity) of S206, rule (point allocation scheme) of S210, and optionally specification of categories to be ranked.

Figure 3:
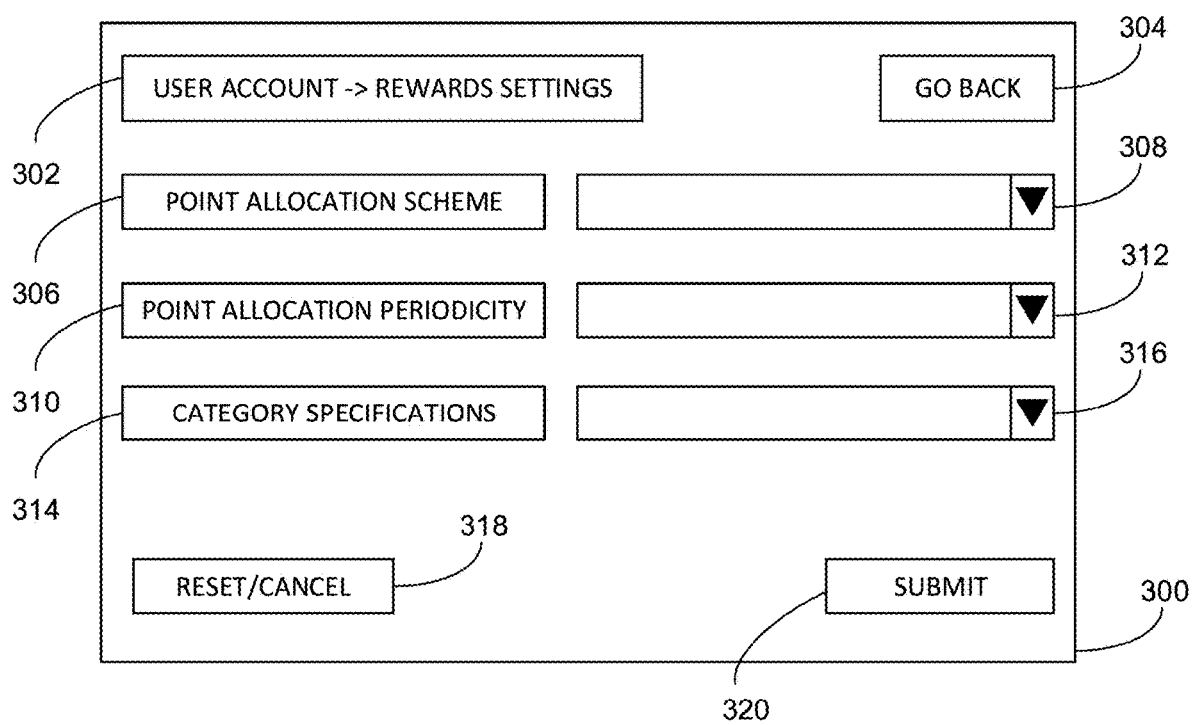
FIG. 3 is an example user interface for setting parameters for dynamic allocation of points of FIG. 2, according to an aspect of the present disclosure.

FIG. 3 is an example user interface for setting parameters for dynamic allocation of points of FIG. 2, according to an aspect of the present disclosure.

FIG. 3 illustrates UI 300. UI 300 may be a particular screen of an application provided by financial institution associated with setting 100. Such application may be provided to users and customers of financial institution that allow users to access their accounts, view balances and transactions, pay bills, etc. Such application may be downloaded and installed on a user's mobile device such as device 106. Alternatively, a user may access his or her account via web portal using a desktop or a laptop computer, a tablet, etc.

UI 300 may be part of the user's account accessible via the application/web portal. There may be a REWARDS SETTINGS feature accessible on the user account. Segment 302 illustrates that REWARDS SETTINGS may be accessed via USER ACCOUNT. Virtual button 304 may allow a user to go back to main page (USER ACCOUNT).

UI 300 may have multiple fields. Identifier 306 identifies field 308 for specifying point allocation scheme. Identifier 310 identifies field 312 for specifying point allocation periodicity. Identifier 314 identifies field 316 for specifying categories to be ranked. Each of fields 308, 312 and 316 may be a dropdown menu allowing a user to select one of available options.

For example, dropdown menu of field 308 may have several options for point allocation scheme such as example 5, 4, 3, 2, 1 point scheme indicating number of points to be allocated to each dollar spending in ranked categories, 3%, 2%, 1% cash back scheme described above for amount of cash back as a percentage of total amount spent in each ranked category, etc. Other examples include 5, 4, 3 point scheme, 3, 2, 1 point scheme, a combination of a point scheme and a cash back scheme (e.g., 3, 2, 1 point scheme and 3%, 2%, 1% cash back scheme).

In another example, dropdown menu of field 312 may have several options for defining periodicity for performing process of FIG. 2 (and specifically the period described with reference to S206). Example options in dropdown menu of field 312 include, but are not limited to, weekly, bi-weekly, monthly, quarterly, semi-annually, annually, etc. Accordingly, transactions in each set period may be processed, categorized followed by categories ranked and points assigned thereto as described above with reference to FIG. 2.

In another example, dropdown menu of field 316 may have several options for defining categories/buckets in which transactions of a defined period may be put. Example options in dropdown menu of field 316 may be any one or more of the categories described above.

One example category is merchant category codes (MCC), each of which identifies a different product category (e.g., grocery, travel, dining, gas, etc.). Another example category is merchandise identifiers, each of which identifies a particular type of product (clothing, lighting, furniture, fitness equipment, etc.). In one example, product types may be defined with more granularity. For example, instead of assigning a different bucket to clothing, lighting, furniture, etc., a different category may be assigned to different types of clothing such as denims, jackets, jeans, etc., or different types of furniture such as beds, dining room furniture, etc.

Another example category is merchant identifiers, each of which identifies a different merchant (e.g., BANANA REPUBLIC v. WHOLE FOODS v. WALMART, etc., as described above).

Another example category is transactional behavioral identifiers, each of which corresponds to a different consumer transactional behavior, the metadata of which may be provided by merchants. Examples of transactional behavioral identifiers include referrals, in-store visits, online clicks, posts, etc., which will be further described below. In this example category and assuming sufficient relevant metadata is provided by merchants, each transaction may have a corresponding transaction behavior identifier. For example, a particular transaction at a store may be the customer's first, second, third or fifth time making a purchase at that same store or with that same merchant. Accordingly, such transactions may be placed in a bucket 116 for repeated in-store visits.

In another example, a particular transaction may be an on-line transaction based on a referral or a posting on a social network platform (can be any known or to be developed social and online platform). Accordingly, the relevant transactions may be placed in a different bucket 116 for online referrals. Then, the system may rank the buckets with, for example, repeated in-store bucket having the highest number of transactions therein. Accordingly, a highest number of points per dollar spent may be assigned (according to a selected point allocation scheme) to transactions in repeated in-store bucket.

Another example category is one or more bonusing identifiers, each of which specifies a structure for assigning bonus points to the corresponding transactions in the account. For example one bonusing structure, as will be described below, may be used in conjunction with one or more categories described above. For example, a bonusing identifier may be used in conjunction with MCC codes such that when spending in a particular category exceeds a defined threshold, an additional multiplier may be applied to points assigned to transactions in the particular category. In another example, a bonusing structure may be set such that a multiplier may be applied to the underlying allocation scheme for assigning point (e.g., 5-4-3-2-1, 3-2-1, etc.) for a given period. The multiplier and the given period may be determined based on experiments and/or empirical studies.

Another example bonusing structure that may be used to define categories is one where rewards servers 112 monitors transactions across all categories and assigns different points to ranked transactions. For example, a single highest transaction may be assigned 3 points per dollar spent, a second single highest transaction may be assigned 2 points per dollar spent, etc. In such example, transactions over a given period may not be separated into buckets and rewards severs 112 may look for, for example, the top three highest transactions to which points are assigned according to a point allocation scheme (e.g., a 3-2-1 point allocation scheme). include, but are not limited to, MCC, merchant type, product type, etc. For example, when MCC is selected, transactions are analyzed to identify MCCs and transactions are assigned to different categories based on their MCC code. In another example, when merchant type is selected, transactions are analyzed to identify merchant type (e.g., particular grocery store, a department store, a bran store, etc.) and transactions are assigned to different merchant categories. In another example, when product type is selected, transactions are analyzed to identify product types (e.g., clothing, fitness, etc.) and transactions are assigned to different product type categories.

Each of fields 308, 312 and 316 may have default values (e.g., 3, 2, 1 point scheme for field 308, monthly for field 312 and MCC for field 316).

UI 300 may also have virtual buttons 318 and 320. Button 318 when selected, may cancel a user's selection in fields 308, 312 and 316 and/or revert back to default values of fields 308, 312 and 316 as described above. Button 320 when selected may submit the user's selections in fields 308, 312 and 316 based on which process of FIG. 2 may be implemented.

One or more variations of point allocation scheme used in process of FIG. 2 will now be described with reference to FIGS. 4 and 5.

For example, a rule based on which points are allocated to different categories, may be a base of points (e.g., 1 point per 1 dollar spent) may be assigned to each transaction regardless of the transaction's corresponding category, on top of which rules such as 5, 4, 3, 2, 1 point scheme and/or 3%, 2%, 1% cash back scheme may be applied to ranked categories.

In another example, a user's account may be assigned a maximum allowed points to be assigned during each given period. When points are assigned to different categories, there may be a remaining balance that may be assigned to all transactions (e.g., equally among all transactions, proportionally to transactions in different buckets depending on a ratio of total amount spent in each category, etc.).

Figure 4:
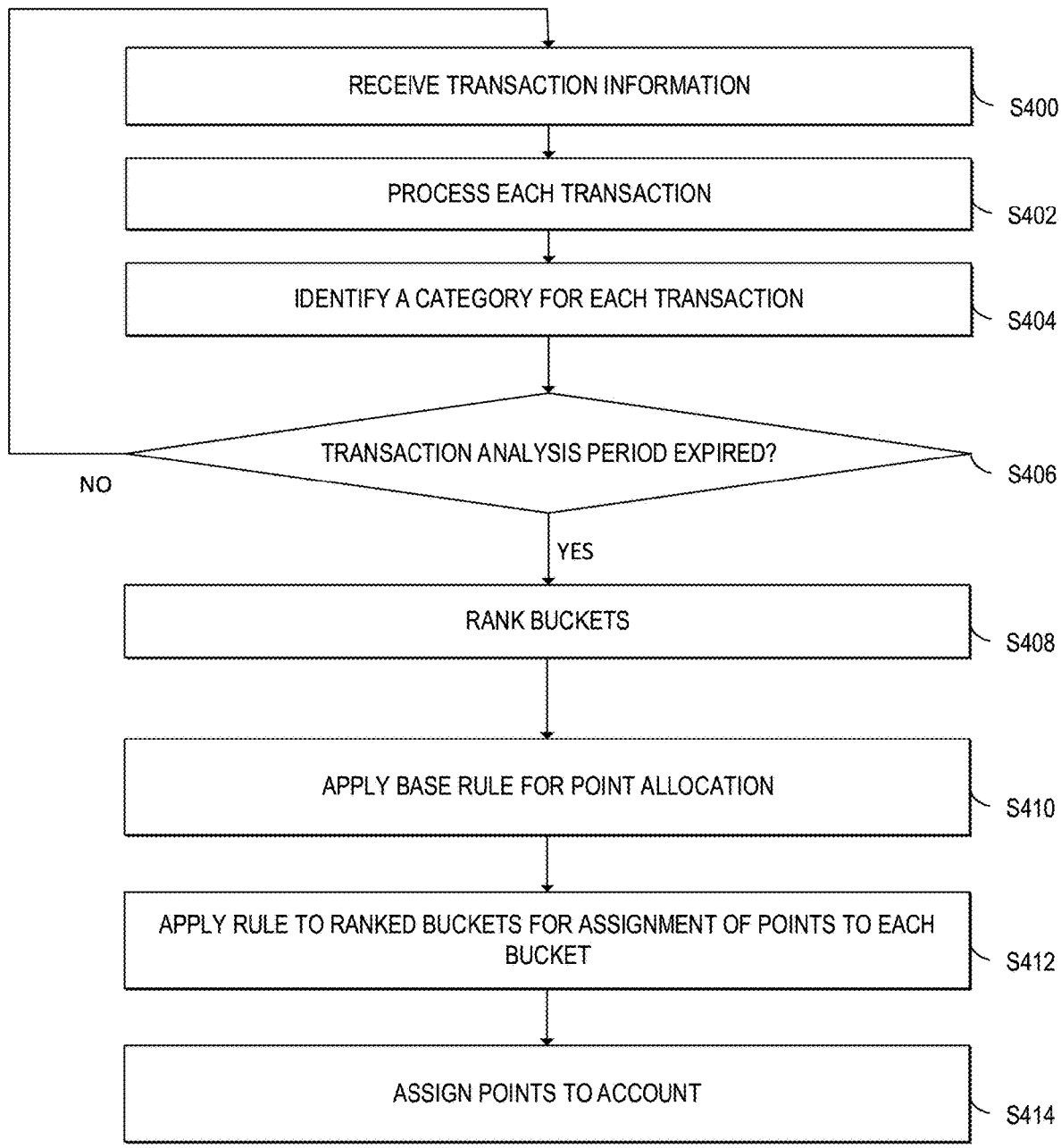
FIG. 4 is an example method of optimizing point allocations, according to an aspect of the present disclosure.

FIG. 4 is an example method of optimizing point allocations, according to an aspect of the present disclosure.

FIG. 4 will be described from the perspective of one or more of rewards servers 112. However, it should be understood that servers 112 may have one or more memories having stored thereon computer-readable instructions, which when executed by one or more associated processors, cause servers 112 to perform functionalities described below with reference to FIG. 2.

At S400, rewards servers 112 may receive transaction information. Such transaction information may be retrieved periodically from database 110 or may be directly received from payment processing server 108 upon processing of each transaction. Said periodicity may be set such that rewards servers 112 may query database 110 every set period of time (e.g., every minute, every hour, every day, etc.) to determine if new strings indicative of recently processed transactions are stored in database 110 or not. Said periodicity may be a configurable parameter determined based on experiments and/or empirical studies. Alternatively, there may be no periodic check by rewards servers 112 but instead, as soon as a new string is stored in database 110 and/or as soon as a transaction is processed by payment processing server 108, corresponding string may be fetched to rewards servers 112 for reward processing.

At S402, rewards servers 112 process each transaction (e.g., relevant string of information queried/fetched from database 110 and/or payment processing server 108) to identify customer information, relevant category for the transaction (with a category defined/selected as one or more of the categories described above), amount of the transaction, date of the transaction, etc. As noted above, such category may be based on MCC codes of transactions, merchant type, product/service type, etc.

At S404, rewards servers 112 store each transaction in one of buckets 116 depending on the identified category at S402. In other words, rewards sever 112 identifies a category for each transactions, with each bucket corresponding to one of the categories.

At S506, rewards servers 112 determine if a period for analyzing transactions for reward/point allocation has expired. As will be described below, such periodicity may be a configurable parameter set by a consumer/user using an application/User Interface (UI).

If not expired, the process reverts back to S400 and rewards servers 112 repeat S400 to S406 until the period expires. Once the period expires, allocation database 114 may have multiple buckets 116, in each of which multiple transactions and relevant information for rewards determination are stored.

At S408, rewards servers 112 rank buckets 116 (ranks categories) according to a transaction parameter. Such transaction parameter can be a number of transactions in each bucket 116, a total amount spent in each category, etc. In another example, a combination of several transaction parameters may be used for ranking buckets. For example, when two buckets have the same number of transactions in them, then rewards servers 112 may rank the bucket with highest total amount spent higher than the other bucket having the same number of transaction but a lesser total amount spent.

Thereafter, rewards servers 112 apply a rule to ranked categories (This process may be carried out by performing S410 and S412). For example, such rule may be defined via UI 300 and field 314 as described above with reference to FIG. 3. Such rule (point allocation scheme) may be the same as those described above with reference to S212 of FIG. 2. In addition, such rule may have a base value (e.g., 1 point per 1 dollar spent) may be assigned to all transactions in all buckets regardless of the transaction's corresponding category, on top of which rules such as 5, 4, 3, 2, 1 point scheme and/or 3%, 2%, 1% cash back scheme may be applied to ranked categories. This may be referred to as a base value+ point allocation scheme rule that consists of a uniform base point for all transactions on top of which points will be assigned to ranked categories similar to that described above with reference to S212 of FIG. 2.

Accordingly, at S410, rewards servers 112 apply a base point to all transactions in all buckets (e.g., 1 point per 1 dollar spent). Accordingly, a total number of base points assigned may be equal to a total balance or amount spent in the period.

Thereafter at S412, server 112 applies points to ranked categories according point allocation scheme, as described with reference to S212. For example, the point allocation scheme may be a range of discrete numbers (e.g., 5, 4, 3, 2, 1) each of which may be assigned to transactions spent in each category in a descending order. For example, 5 points may be assigned to every dollar amount spent in the highest ranked bucket, 4 points may be assigned to every dollar amount spent in the second highest ranked bucket, 3 points may be assigned to every dollar amount spent in the third highest ranked bucket, 2 points may be assigned to every dollar amount spent in the fourth highest ranked bucket, while 1 point is assigned to every dollar spent in the lowest ranked bucket.

In one example, a ranking of buckets may be such that two or more buckets may be ranked the same (e.g., having the same number of transactions and/or the same total amount spent). Accordingly, same number of points may be assigned to each transaction in both buckets.

Another example rule may be a percentage based rule (e.g., 3%, 2%, 1%). Accordingly, 3% cash back may be credited to a given user's account as a percentage of the total amount spent in the highest ranked category, 2% cash back may be credited to a given user's account as a percentage of the total amount spent in the second highest ranked category, 1% cash back may be credited to a given user's account as a percentage of the total amount spent in the lowest ranked category, etc.

In one example, a ranking of buckets may be such that two or more buckets may be ranked the same (e.g., having the same number of transactions and/or the same total amount spent). Accordingly, same percentage cash back points may be assigned to each of the two buckets as a percentage of the total amount spent in each bucket.

At S414, rewards servers 112 determine a total number of points to be assigned to a corresponding account of a user based on the base value and different number of points assigned to each bucket per the point allocation scheme. For example, the total amount spent in the user's account for a period may be $2500. Accordingly, a base of 2500 points will be assigned to the account. Furthermore, the assignment of points, according to the allocation scheme, may be such that 5000 points are assigned to transactions in the highest ranked category, 3000 points to transactions in the next highest ranked category and 1000 points to transactions in the lowest ranked category. Accordingly, a total of 11500 points is assigned to all transactions in a user's account for a given period, which is then applied to the user's account at S414.

Upon performing S414, the process reverts back to S400 and rewards servers 112 repeat the process of FIG. 4, periodically. Accordingly, rewards servers 112 periodically categorize transactions, rank the categories and assign points to the ranked categories to optimize allocation of points. When a user's spending pattern changes from one period to the next (e.g., from spending the most on travel category in a first period to spending the most on grocery in the second period), the process of FIG. 4 results in a different ranking of categories and hence different assignment of points to transactions in each category. Therefore, backend processing center of setting 100 can use rewards servers 112 to dynamically optimize this process while allowing the use of a single financial vehicle by a user to capture the most points for a user depending on their spending patterns. As a consequence, backend processing system of setting 100 need not have multiple reward processing servers and capacities each dedicated to a separate/fixed rewards program/card, each of which (or multiple ones) being used by a single user.

Figure 5:
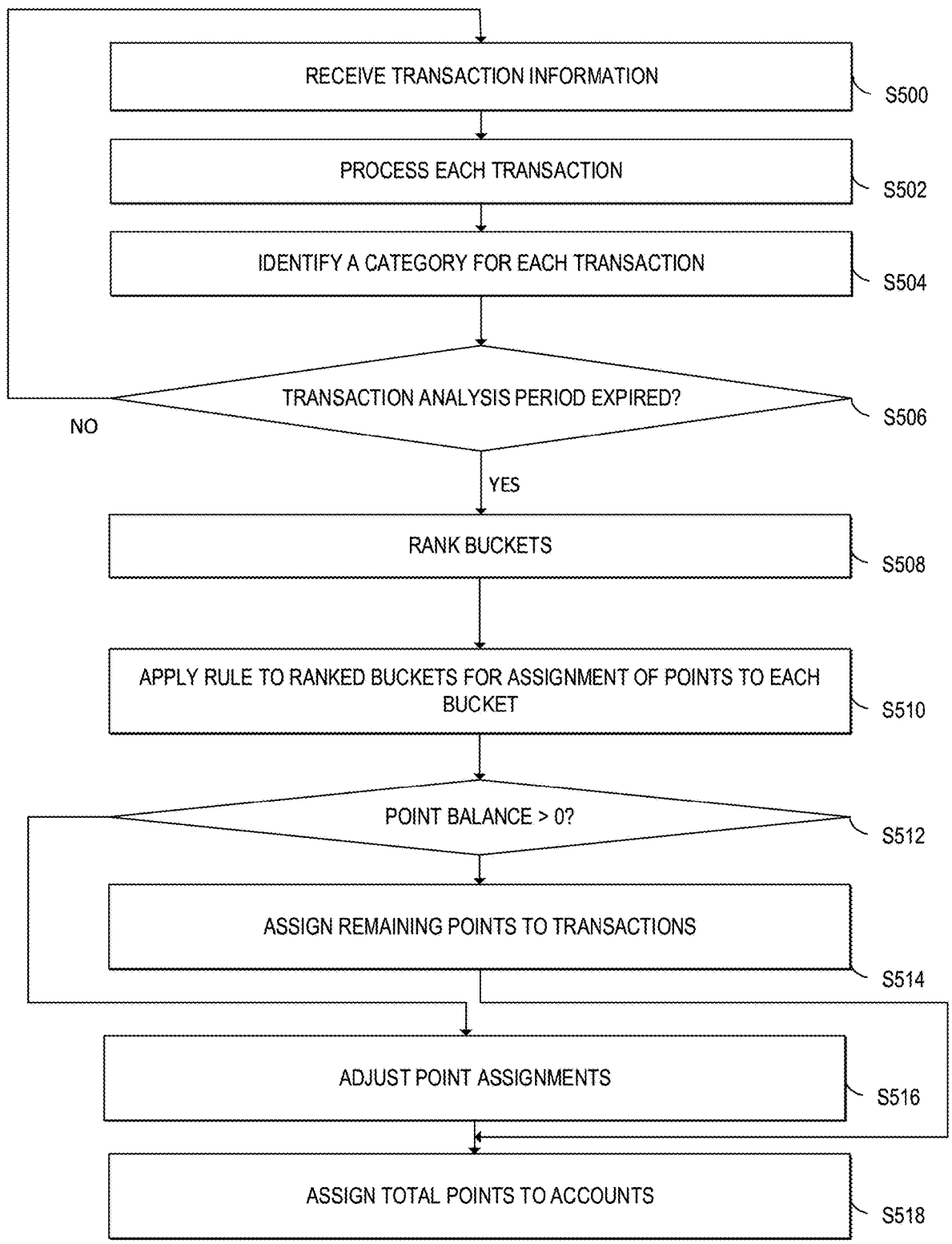
FIG. 5 is an example method of optimizing point allocations, according to an aspect of the present disclosure.

FIG. 5 is an example method of optimizing point allocations, according to an aspect of the present disclosure.

FIG. 5 will be described from the perspective of one or more of rewards servers 112. However, it should be understood that servers 112 may have one or more memories having stored thereon computer-readable instructions, which when executed by one or more associated processors, cause servers 112 to perform functionalities described below with reference to FIG. 2.

At S500, rewards servers 112 may receive transaction information. Such transaction information may be retrieved periodically from database 110 or may be directly received from payment processing server 108 upon processing of each transaction. Said periodicity may be set such that rewards servers 112 may query database 110 every set period of time (e.g., every minute, every hour, every day, etc.) to determine if new strings indicative of recently processed transactions are stored in database 110 or not. Said periodicity may be a configurable parameter determined based on experiments and/or empirical studies. Alternatively, there may be no periodic check by rewards servers 112 but instead, as soon as a new string is stored in database 110 and/or as soon as a transaction is processed by payment processing server 108, corresponding string may be fetched to rewards servers 112 for reward processing.

At S502, rewards servers 112 process each transaction (e.g., relevant string of information queried/fetched from database 110 and/or payment processing server 108) to identify customer information, relevant category for the transaction (with a category determined/selected as one of the categories described above), amount of the transaction, date of the transaction, etc. As noted above, such category may be based on MCC codes of transactions, merchant type, product/service type, etc.

At S504, rewards servers 112 store each transaction in one of buckets 116 depending on the identified category at S502. In other words, rewards severs 112 identify a category for each transactions, with each bucket corresponding to one of the categories.

At S506, rewards servers 112 determine if a period for analyzing transactions for reward/point allocation has expired. As will be described below, such periodicity may be a configurable parameter set by a consumer/user using an application/User Interface (UI).

If not expired, the process reverts back to S400 and rewards servers 112 repeat S400 to S406 until the period expires. Once the period expires, allocation database 114 may have multiple buckets 116, in each of which multiple transactions and relevant information for rewards determination are stored.

At S508, rewards servers 112 rank buckets 116 (ranks categories) according to a transaction parameter. Such transaction parameter can be a number of transactions in each bucket 116, a total amount spent in each category, etc. In another example, a combination of several transaction parameters may be used for ranking buckets. For example, when two buckets have the same number of transactions in them, then rewards servers 112 may rank the bucket with highest total amount spent higher than the other bucket having the same number of transaction but a lesser total amount spent.

Once ranked, at S510, rewards servers 112 apply a rule (point allocation scheme) to ranked categories. For example, such rule may be defined via UI 300 as described above with reference to FIG. 3. Such rule (point allocation scheme) may be the same as those described above with reference to S212 of FIGS. 2 and/or S410 and S412 of FIG. 4.

A variation of point allocation schemes described above, is that over any given period of time, there may be a maximum allowed points to be assigned to a given user's account. Threshold of such maximum allowed points may be determined according to any known or to be developed method. It may be manual, may be based on spending habits and length of membership of the user, status of the user (e.g., platinum member, gold member, etc.), etc.

Accordingly, at S512 and after points are assigned to ranked categories per S510 (same as that described above with reference to S212 and/or S410 and S412 of FIG. 4), rewards servers 112 determine if a balance of points (difference between maximum allowed points for the given account and a sum of all points assigned to ranked categories per S510) is greater than zero.

If at S512, rewards servers 112 determine that the balance is greater than zero, then at S514, rewards servers 112 applies the remaining balance to the ranked categories. Such ranking may be uniform across all transactions (e.g., remaining balance divided by total amount spent in the account across all categories). In another example, the ranking may be proportional such that each category gets a portion of the remaining balance relative to ratio of total amount spent in that category to the total amount spent in the account. Thereafter the process proceeds to S516, which will be described below.

If at S512, rewards servers 112 determine that the balance is not greater than zero (zero or negative), then at S514, rewards servers 112 may adjust the points allocated/assigned to ranked categories. For example, if the balance is negative, a proportional amount of points may be deducted from transactions in each category to ensure that the total number of points assigned to all categories does not exceed the maximum allowed points for a corresponding account.

Thereafter, the process proceeds to S516, where rewards servers 112 determine a total number of points to be assigned to a corresponding account of a user based the assigned points per S510, S514 and/or S516.

For example, an account may have a maximum allowed points to be assigned that is equal to 15000. Furthermore, it is assumed that the highest ranked category has $2500 of spending over a given period, the second highest ranked category has $2000 of spending over the given period and the lowed ranked category has $1000 of spending over the same given period. With an allocation scheme of 3, 2, 1, at S510, 7500 points are assigned to the highest ranked category, 6000 points are assigned to the second highest ranked category and 1000 points are assigned to the lowest ranked category for a total of 14500 points assigned to the account for the given period. Accordingly, a balance of 500 point remain per S512 and at S514 the 500 points is proportionally assigned to each of the three categories with 227 assigned to highest ranked category, which is determined by multiplying 500 with ratio of $2500 spent in the highest ranked category to total spent of $5500 in the account. Similarly and using the same methodology, 181 points are assigned to second highest category and 92 points assigned to the lowest ranked category.

Upon performing S516, the process reverts back to S500 and rewards servers 112 repeat the process of FIG. 5, periodically. Accordingly, rewards servers 112 periodically categorize transactions, rank the categories and assign points to the ranked categories to optimize allocation of points. When a user's spending pattern changes from one period to the next (e.g., from spending the most on travel category in a first period to spending the most on grocery in the second period), the process of FIG. 5 results in a different ranking of categories and hence different assignment of points to transactions in each category. Therefore, backend processing center of setting 100 can use rewards servers 112 to dynamically optimize this process while allowing the use of a single financial vehicle by a user to capture the most points for a user depending on their spending patterns. As a consequence, backend processing system of setting 100 need not have multiple reward processing servers and capacities each dedicated to a separate/fixed rewards program/card, each of which (or multiple ones) being used by a single user.

FIG. 6 is an example of dynamic point allocation for two different periods when a point allocation methods of the present disclosure are applied to an account, according to an aspect of the present disclosure.

Table 600 of FIG. 6 has multiple rows. Row 602 shows examples of two periods (e.g., months of January and February). Row 604 illustrates categories spending on the account in each of the two months. Specifically, in the month of January, the cardholder made $1000 purchases in Travel, $700 in Dining, $650 on Groceries and $1000 across several other Merchant Category Codes (MCC). Similarly, in the month of February, the cardholder made $500 purchases in Groceries, $300 in Gas, $200 in Travel and $900 across several other Merchant Category Codes (MCC).

Row 606 illustrates that, based on a 3, 2, 1 point allocation scheme, 3 points are assigned to the highest ranked category for each period (e.g., 3 points assigned to each dollar spent in travel category in January v. 3 points assigned to each dollar spent in grocery category in February).

Similarly, row 608 illustrates that, based on a 3, 2, 1 point allocation scheme, 2 points are assigned to the second highest ranked category for each period (e.g., 2 points assigned to each dollar spent in dining category in January v. 2 points assigned to each dollar spent in gas category in February).

Similarly, row 610 illustrates that, based on a 3, 2, 1 point allocation scheme, 1 points are assigned to the lowest ranked category for each period (e.g., 1 points assigned to each dollar spent in groceries+all other categories in January v. 1 points assigned to each dollar spent in travel+all other categories in February).

Table 600 illustrates the dynamic nature of point allocations to an account depending on changes in spending patterns by a corresponding user. In one period, when the user spends the most on travel, the rewards servers 112 assigns the most points per dollar spent to the travel category and when the same user, using the same financial vehicle, spends the most on groceries in the following month, the rewards servers dynamically adjust and assign the highest number of points to the groceries category.

The present disclosure provides several example methods for optimizing allocation of points. However, such allocation of points is not limited to separately applying any given one example but instead may be a combination of all example methods. For example, one allocation scheme may be a combination of example of FIGS. 4 and 5, where there may be a maximum allowed points to be assigned to an application with the allocation scheme having a base point applied to all transactions as well as an allocation scheme for ranked categories as described per FIG. 4.

The allocation of points as described above, may be retroactive. Specifically, at the end of each period, the assigned points may be applied to transactions in that period. In an alternative, the assigned points may be applied to similar transactions in the next period. For example, if the highest ranked category in the month of January is the travel category with $1000 spent, then 3 points may be applied to every dollar spent in travel category over the next period (e.g., month of February) or over the next several periods (e.g., February until April).

In another example, processes for point allocation as described above, may be applied to several periods instead of one period at a time. For example, instead of ranking categories and subsequently assigning points to ranked categories over a single period of time, categories may be ranked over several periods (e.g., past few months) and subsequently points are assigned to such categories.

With example systems and methods for dynamic point allocation described with reference to FIGS. 1-6, the disclosure now turns to example system components and architectures that can be used to implement example systems and components such as rewards servers 112, user device 106, POS device 104, payment processing server 108, etc.

Figure 7A:
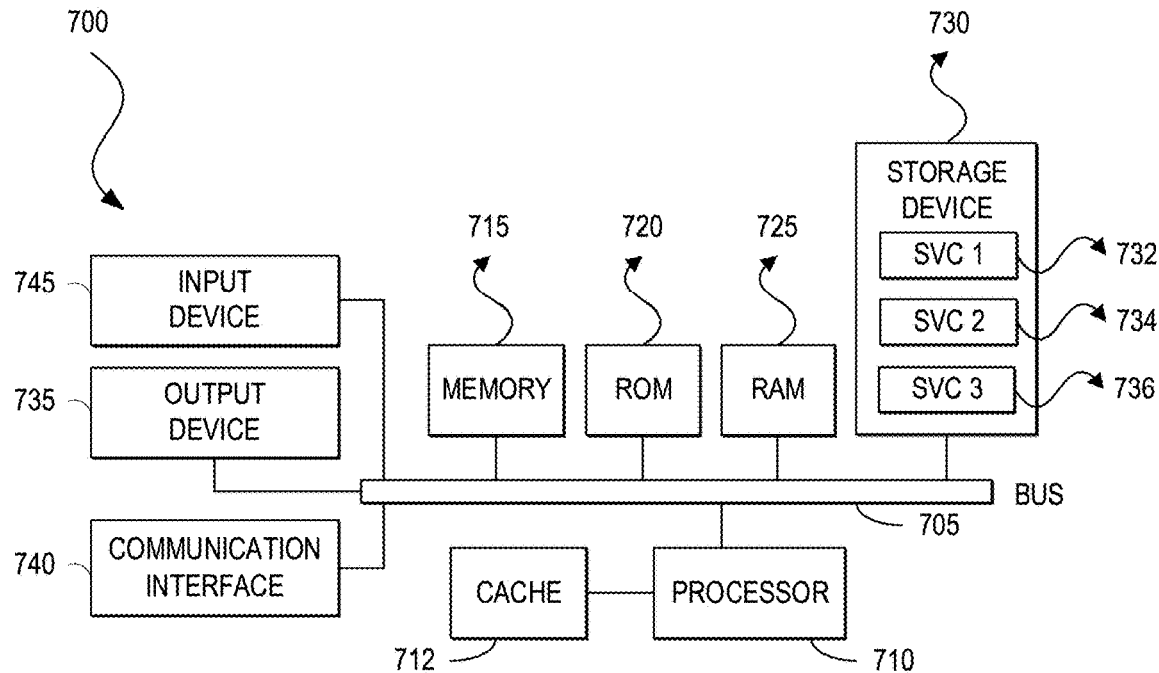
FIGS. 7A and 7B illustrate example systems, according to an aspect of the present disclosure.
Figure 7B:
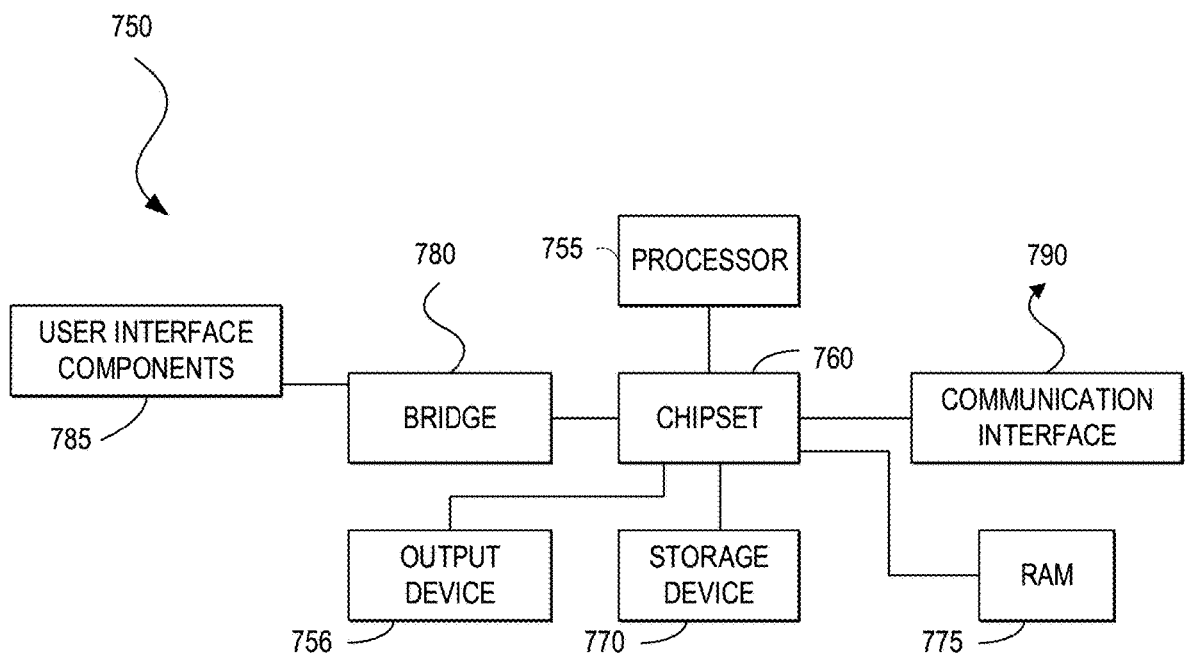

FIGS. 7A and 7B illustrate example systems, according to an aspect of the present disclosure. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as services (SVC) 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

Like reference numbers and designations in the various drawings indicate like elements.

The disclosed secure and automated system for processing of time sensitive data can be performed using a computing server. An example computing server can include a processor (e.g., a central processing unit), memory, non-volatile memory, and an interface device. The memory may store data and/or and one or more code sets, software, scripts, etc. The components of the computer server can be coupled together via a bus or through some other known or convenient device. The processor may be configured to carry out all or part of methods described herein for example by executing code for example stored in memory. One or more of a user device or computer, a provider server or server, or a suspended database update server may include the components of the computing server or variations on such a server.

This disclosure contemplates the computer server taking any suitable physical form. As example and not by way of limitation, the computer server may be an embedded computer server, a server-on-chip (SOC), a single-board computer server (SBC) (such as, for example, a computer-on-module (COM) or server-on-module (SOM)), a desktop computer server, a laptop or notebook computer server, an interactive kiosk, a mainframe, a mesh of computer servers, a mobile telephone, a personal digital assistant (PDA), a server, or a combination of two or more of these. Where appropriate, the computer server may include one or more computer servers; be unitary or distributed; span multiple locations; span multiple machines; and/or reside in a cloud, which may include one or more cloud components in one or more networks. Where appropriate, one or more computer servers may perform without substantial spatial or temporal limitation one or more steps of one or more methods described or illustrated herein. As an example and not by way of limitation, one or more computer servers may perform in real time or in batch mode one or more steps of one or more methods described or illustrated herein. One or more computer servers may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because servers can be created with all applicable data available in memory. A typical computer server will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer server. The interface can include an analog modem, Integrated Services Digital network (ISDN0 modem, cable modem, token ring interface, satellite transmission interface (e.g., "direct PC"), or other interfaces for coupling a computer server to other computer servers. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer server can be controlled by operating server software that includes a file management server, such as a disk operating server. One example of operating server software with associated file management server software is the family of operating servers known as Windows® from Microsoft Corporation of Redmond, WA, and their associated file management servers. Another example of operating server software with its associated file management server software is the Linux™ operating server and its associated file management server. The file management server can be stored in the non-volatile memory and/or drive unit and can cause the processor to execute the various acts required by the operating server to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer server, or similar electronic computing device, that manipulates and transforms data represented as physical (electronic) quantities within registers and memories of the computer server into other data similarly represented as physical quantities within the computer server memories or registers or other such information storage, transmission or display devices.

The algorithms and displays presented herein are not inherently related to any particular computer or other apparatus. Various general purpose servers may be used with programs in accordance with the teachings herein, or it may prove convenient to construct more specialized apparatus to perform the methods of some examples. The required structure for a variety of these servers will appear from the description below. In addition, the techniques are not described with reference to any particular programming language, and various examples may thus be implemented using a variety of programming languages.

In various implementations, the server operates as a standalone device or may be connected (e.g., networked) to other servers. In a networked deployment, the server may operate in the capacity of a server or a client server in a client-server network environment, or as a peer server in a peer-to-peer (or distributed) network environment.

The server may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any server capable of executing a set of instructions (sequential or otherwise) that specify actions to be taken by that server.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the server and that cause the server to perform any one or more of the methodologies or modules of disclosed herein.

In general, the routines executed to implement the implementations of the disclosure, may be implemented as part of an operating server or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer servers, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a server, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ servers having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other servers, not necessarily the server described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the servers, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the server may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer server bus. Furthermore, any computing servers referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of servers and components for a contextual connection server. It will be understood by one of ordinary skill in the art, however, that the implementations described above may be practiced without these specific details. For example, circuits, servers, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing servers that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback server, a printer, and/or other types of output devices. A data storage device, such as a hard drive or flash memory, can enable the computing device to temporarily or permanently store data. A network interface, such as a wireless or wired interface, can enable the computing device to communicate with a network.

Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall server. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update server.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    identifying categories associated with transactions, wherein the transactions are associated with a plurality of accounts;
    generating a ranking of the categories, wherein the ranking includes a subset of the categories, wherein the ranking is generated based on a plurality of transaction parameters, and wherein the plurality of transaction parameters include a number of transactions and an amount spent for the categories;
    determining a total number of points eligible for an account of the plurality of accounts, wherein the total number of points are determined based on a total amount spent during a particular time period;
    determining a distributed number of points for the account, wherein the distributed number of points are distributed across the subset of categories, wherein the distributed number of points are determined based on the ranking and a point allocation scheme, and wherein the point allocation scheme includes a base point allocation scheme and an account specific point allocation scheme;
    comparing the total number of points eligible for the account and the distributed number of points for the account;
    adjusting the distributed number of points based on the comparison; and
    dynamically assigning the adjusted number of points to the subset of categories for the account.

2. The computer-implemented method of claim 1, wherein the base point allocation scheme specifies how points should be assigned to the transactions across the categories.

3. The computer-implemented method of claim 1, wherein the transactions are further associated with communication data between a plurality of point of sale devices and a payment processing server.

4. The computer-implemented method of claim 1, wherein the point allocation scheme is determined based on a set of configurable specifications, and
wherein the set of configurable specifications are set via a graphical user interface.

5. The computer-implemented method of claim 1, wherein the point allocation scheme is determined based on a set of configurable specifications, and
wherein the set of configurable specifications include one or more of a plurality of account specific point allocation schemes, and wherein the account specific point allocation scheme is selected from the plurality of account specific point allocation schemes.

6. The computer-implemented method of claim 1, wherein a single financial vehicle is utilized to determine the total number of points eligible for the account.

7. The computer-implemented method of claim 1, wherein the account specific point allocation scheme is associated with the account, and wherein the account specific point allocation scheme includes account specific rules that modify the base point allocation scheme differently for the plurality of accounts.

8. The computer-implemented method of claim 1, wherein adjusting of the distributed number of points is further based on the point allocation scheme.

9. A monitoring system comprising:
memory; and
one or more processors coupled to the memory, wherein the one or more processors are configured to perform operations including:
identifying categories associated with transactions, wherein the transactions are associated with a plurality of accounts;
generating a ranking of the categories, wherein the ranking include a subset of the categories, wherein the ranking is generated based on a plurality of transaction parameters, and wherein the plurality of transaction parameters include a number of transactions and an amount spent for the categories;
determining a total number of points eligible for an account of the plurality of accounts, wherein the total number of points are determined based on a total amount spent during a particular time period;
determining a distributed number of points for the account, wherein the distributed number of points are distributed across the subset of categories, wherein the distributed number of points are determined based on the ranking and a point allocation scheme, and wherein the point allocation scheme includes a base point allocation scheme and an account specific point allocation scheme;
comparing the total number of points eligible for the account and the distributed number of points for the account;
adjusting the distributed number of points based on the comparison; and
dynamically assigning the adjusted number of points to the subset of categories for the account.

10. The monitoring system of claim 9, wherein the base point allocation scheme specifies how points should be assigned to the transactions across the categories.

11. The monitoring system of claim 9, wherein the transactions are further associated with communication data between a plurality of point of sale devices and a payment processing server.

12. The monitoring system of claim 9, wherein the point allocation scheme is determined based on a set of configurable specifications, and
wherein the set of configurable specifications are set via a graphical user interface.

13. The monitoring system of claim 9, wherein the point allocation scheme is determined based on a set of configurable specifications, and
wherein the set of configurable specifications include one or more of a plurality of account specific point allocation schemes, and wherein the account specific point allocation scheme is selected from the plurality of account specific point allocation schemes.

14. The monitoring system of claim 9, wherein a single financial vehicle is utilized to determine the total number of points eligible for the account.

15. The monitoring system of claim 9, wherein the account specific point allocation scheme is associated with the account, and wherein the account specific point allocation scheme includes account specific rules that modify the base point allocation scheme differently for the plurality of accounts.

16. The monitoring system of claim 9, wherein adjusting of the distributed number of points is further based on the point allocation scheme.

17. A non-transitory computer-readable medium comprising instructions that, when executed by one or more processors of a monitoring system, cause the monitoring system to perform operations comprising:
identifying categories associated with transactions, wherein the transactions are associated with a plurality of accounts;
generating a ranking of the categories, wherein the ranking includes a subset of the categories, wherein the ranking is generated based on a plurality of transaction parameters, and wherein the plurality of transaction parameters include a number of transactions and an amount spent for the categories;
determining a total number of points eligible for an account of the plurality of accounts, wherein the total number of points are determined based on a total amount spent during a particular time period;
determining a distributed number of points for the account, wherein the distributed number of points are distributed across the subset of categories, wherein the distributed number of points are determined based on the ranking and a point allocation scheme, and wherein the point allocation scheme includes a base point allocation scheme and an account specific point allocation scheme;
comparing the total number of points eligible for the account and the distributed number of points for the account;
adjusting the distributed number of points based on the comparison; and
dynamically assigning the adjusted number of points to the subset of categories for the account.

18. The non-transitory computer-readable medium of claim 17, wherein the base point allocation scheme specifies how points should be assigned to the transactions across the categories.

19. The non-transitory computer-readable medium of claim 17, wherein the transactions are further associated with communication data between a plurality of point of sale devices and a payment processing server.

20. The non-transitory computer-readable medium of claim 17, wherein the point allocation scheme is determined based on a set of configurable specifications, and
  wherein the set of configurable specifications are set via a graphical user interface.

21. The non-transitory computer-readable medium of claim 17, wherein the point allocation scheme is determined based on a set of configurable specifications, and
  wherein the set of configurable specifications include one or more of a plurality of account specific point allocation schemes, and wherein the account specific point allocation scheme is selected from the plurality of account specific point allocation schemes.

22. The non-transitory computer-readable medium of claim 17, wherein a single financial vehicle is utilized to determine the total number of points eligible for the account.

23. The non-transitory computer-readable medium of claim 17, wherein the account specific point allocation scheme is associated with the account, and wherein the account specific point allocation scheme includes account specific rules that modify the base point allocation scheme differently for the plurality of accounts.

24. The non-transitory computer-readable medium of claim 17, wherein adjusting of the distributed number of points is further based on the point allocation scheme.

* * * * *